United States Patent Office 3,123,620
Patented Mar. 3, 1964

3,123,620
FLUOROALKOXY PHTHALIDES
Werner Victor Cohen, Glen Farms, Md., assignor to E. I. du Pont de Nemours and Company, Wilmington, Del., a corporation of Delaware
No Drawing. Filed Jan. 31, 1963, Ser. No. 255,178
4 Claims. (Cl. 260—343.3)

This invention is directed to dielectric materials and to compositions containing said materials. More particularly, the present invention relates to 3-(polyfluoroalkoxy)-3-alkyl (or aryl) phthalides having a high dielectric constant and other properties that well adapt them for use as dielectrics. The new and useful dielectrics of the invention are represented by the formula

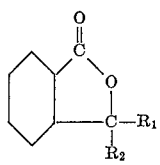

where $R_1$ is a polyfluoroalkoxy group having the formula —$OCH_2(CF_2)_nY$ where Y is hydrogen or fluorine and $n$ is an integer 1 to 5 and $R_2$ is methyl, ethyl, phenyl or tolyl. These compounds have an unexpectedly high dielectric constant, good thermal stability, and low vapor pressure and are valuable for use as dielectric media by themselves, as components of compositions of mixed synthetic dielectric materials, and as impregnants in liquid impregnated paper dielectric compositions in electrical equipment.

In designing and developing electrical equipment such as capacitors, cables, electronic devices, rotating machinery, switchgear, transformers and the like, there is a significant need for dielectrics with higher dielectric constants and other improved properties than those possessed by materials already in use. Dielectrics are needed, for example, to store electrical energy in capacitors, to sustain high voltages in cables, to insulate one conducting element from another in electronic devices and in rotating machinery, to interrupt the arc in switchgear, and to cool transformers. The requirements for such dielectrics are, among other things, high resistance to the flow of electric currents, high stability to atmospheric conditions at ordinary and at somewhat elevated temperatures, high resistance to thermal decomposition, low vapor pressure, low pour point, low inflammability, and high flash point.

Mica is extensively used as a dielectric, although it cannot be used as an impregnant. As a capacitor dielectric mica has been satisfactory because of its high dielectric constant (7 to 8), its low power factor (about 0.1%), and the property of splitting into thin sheets of uniform thickness. Major disadvantages of mica are the limited size of individual sheets of the material, their high cost of preparation, and the relatively low voltage at which gas ionization leading to breakdown occurs in mica capacitors. Impregnation of mica capacitors is difficult owing to the imperviousness of mica.

Among the commonly used liquid dielectrics and dielectric impregnants are petroleum oil and chlorinated aromatic hydrocarbons. Petroleum oil is widely used as a dielectric particularly in transformers, switchgear, and capacitors, but petroleum oil has a relatively low dielectric constant (about 2), is a poor heat transfer agent, decomposes when subjected to electric discharge, and gradually forms tarry products and sludge deposits that adversely affect the electrical properties. Among the decomposition products are gases that present fire and explosion hazards. Highly chlorinated aromatic hydrocarbons as dielectrics offer several advantages over petroleum oil and have permitted marked electrical engineering advances to be made. This class of compounds has a dielectric constant (5 to 6 at 25° C.) over twice that of petroleum oil, is flameproof, does not give off flammable or explosive gases, and makes possible a large reduction in the size of capacitors. Such a size reduction results in a lower cost of the finished unit even though the synthetic dielectric may cost several times more than the petroleum oil it replaces. When a power distribution capacitor is reduced in size, for example, to one-half that of the older oil-impregnated unit, not only is half as much dielectric required but only about one-half as much paper, aluminum foil, steel for the container, etc. are needed. The reduced weight and decreased size of the capacitor provide obvious advantages in its storage, handling, and ultimate use. In transformers when the chlorinated aromatic hydrocarbons are subjected to arcing they give off hydrochloric acid gas which attacks the cellulosic insulation. The effect on cellulose, while partially corrected by the use of acid absorbing agents such as tin tetraphenyl, is a condition to be further corrected. The chlorinated aromatic hydrocarbons have high solvent power for most varnishes and some insulating materials so care must be taken in the selection of varnishes and other materials used in the chlorinated hydrocarbon-filled transformers and capacitors.

It is an object of the present invention to provide novel dielectric materials for the insulation of elements in electrical equipment wherein a medium having an unusally high dielectric constant is required. Another object is to provide a high dielectric for electrical equipment having a long useful life. A still further object of this invention is to provide a dielectric for capacitors that permits an economical and useful reduction in the size and weight of the units without sacrificing the construction and performance features that prolonged life and service require. These and other objects will become apparent in the following description and claims.

The heretofore described objects are attained with the novel dielectric materials and compositions of the present invention, that is, certain 3-(polyfluoroalkoxy)-3-alkyl (or aryl) phthalides. These new dielectrics have a dielectric constant in the range of 15 to 33; a resistance to thermal decomposition; no tendency to give off corrosive, or cellulose-degrading products; a low vapor pressure; and a high flash point. These dielectrics are particularly well adapted for use in capacitors in which a material with a high dielectric constant allows substantial reduction in the unit size of the equipment.

More specifically, the present invention is directed to a dielectric material represented by the formula

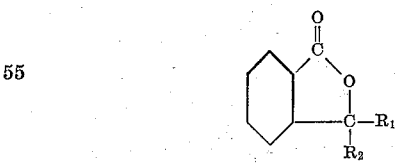

where $R_1$ is a polyfluoroalkoxy group having the formula —$OCH_2(CF_2)_nY$ where Y is hydrogen or fluorine and $n$ is an integer 1 to 5, and $R_2$ is methyl, ethyl, phenyl or tolyl, said dielectric having a dielectric constant of at least 15.

The present invention also encompasses dielectric compositions comprising (1) one or more of the heretofore described 3-(polyfluoroalkoxy)-3-alkyl (or aryl) phthalides and (2) a chlorinated aromatic hydrocarbon selected from the group consisting of a chlorinated monocyclic aromatic hydrocarbon and a chlorinated dicyclic aromatic hydrocarbon, said phthalide or phthalides constituting not less than 10% by weight of said dielectric composition.

The preferred dielectric materials of the present invention include 3-(1H,1H-trifluoroethoxy)-3-phenylphthalide,
3-(1H,1H,3H-tetrafluoropropoxy)-3-methylphthalide, and
3-(1H,1H,3H-tetrafluoropropoxy)-3-phenylphthalide.

A dielectric composition comprising 3-(1H,1H,3H-tetrafluoropropoxy)-3-phenylphthalide and trichlorobiphenyl isomers, the phthalide part of this composition constituting not less than 10% by volume of said composition represents another preferred embodiment.

Representative dielectric phthalides of the present invention are:

3-(1H,1H,3H-tetrafluoropropoxy)-3-methylphthalide
3-(1H,1H-heptafluorobutoxy)-3-methylphthalide
3-(1H,1H,5H-octafluoropentoxy)-3-methylphthalide
3-(1H,1H-trifluoroethoxy)-3-ethylphthalide
3-(1H,1H-nonafluoropentoxy)-3-ethylphthalide
3-(1H,1H-trifluoroethoxy)-3-phenylphthalide
3-(1H,1H,3H-tetrafluoropropoxy)-3-phenylphthalide
3-(1H,1H,5H-octafluoropentoxy)-3-phenylphthalide
3-(1H,1H,3H-tetrafluoropropoxy)-3-m-tolylphthalide
3-(1H,1H,heptafluorobutoxy)-3-p-tolylphthalide Chlorinated aromatic hydrocarbons may be mixed with one or more of the dielectric phthalides of this invention to compose dielectric compositions and include benzene, toluene, alkyl ($C_2$ to $C_4$) benzenes, and biphenyl having 3 to 5 substituted chlorine atoms in the ring structure of the respective hydrocarbons, particularly the mixed isomers of these chlorinated compounds. Among the representative chlorinated hydrocarbons we may use are the isomers of the following:

Trichlorobenzene
Ethyltrichlorobenzene
Isopropyltrichlorobenzene
Ethyltetrachlorobenzene
Butyltetrachlorobenzene
Trichlorotoluene
Trichlorobiphenyl
Tetrachlorobiphenyl
Pentachlorobiphenyl
Tetrachlorotoluene
Mixed tri- and tetrachlorobiphenyls
Mixed tetra- and pentachlorobiphenyls
Mixed tetrachlorobiphenyl isomers and
Trichlorobenzene isomers and the like One may also mix with the dielectric phthalides of this invention, ethylpentachlorobenzene, butylpentachlorobenzene, pentachlorotoluene and any specific isolated isomer of chlorinated benzene, toluene, or alkyl ($C_2$ to $C_4$) benzene having three or four chlorine atoms.

The phthalides are prepared by reacting the respective o-substituted benzoic acid with thionyl chloride, phosphorus pentachloride, silicon tetrachloride or oxalyl chloride, to form the 3-chloro-3-alkyl (or aryl) phthalides and then combining this chlorophthalide with a polyfluoroalkanol. o-Benzoylbenzoic acid is available commercially and o-acetylbenzoic acid may be purchased from chemical suppliers. The preparation of o-propionylbenzoic acid is described in Beilstein, 10, 701; 10I, 333.

To have the required electrical properties, the dielectric phthalides of this invention must be purified to a high degree. A high purity is of utmost importance because ionic impurities and moisture lead to a loss of electrical energy in the form of heat when the compounds are used as dielectrics. Such an energy loss is measured by the power factor. The procedures used for purifying the subject phthalides include distillation, water washing to remove acidic and other ionic impurities, the use of ion exchange resins and electrolytic techniques, and drying in absorption columns. The absorption columns may contain one or more of such moisture absorbents as silica gel, basic alumina, calcium hydride, sodium-calcium aluminosilicates.

The present novel dielectric phthalides or novel dielectric compositions containing them may be treated with small amounts of oxidation stabilizing agents; they may also be treated with acid or metal deactivating agents without impairing the usefulness of the compounds or compositions as dielectrics.

The dielectric phthalides of this invention having a high dielectric constant may be used as dielectrics by themselves or in dielectric compositions in many types of electrical equipment such as capacitors, cables, electronic equipment, rotating machinery, switchgear, transformers. One of the uses for which the new dielectrics are particularly well adapted is as a dielectric in capacitors. The high dielectric constant of these compounds makes possible a substantial reduction in the size and construction cost of a capacitor.

Representative examples illustrating the present invention follow.

EXAMPLE 1

*3-(1H,1H,3H-Tetrafluoropropoxy)-3-Methylphthalide as a Dielectric*

A two-terminal unshielded electrical measuring cell was filled with 3-(1H,1H,3H-tetrafluoropropoxy)-3-methylphthalide and its capacitance measured by placing the cell in a constant temperature bath at 25° C. and connecting it to an electrical circuit comprising a capacitance bridge of the Schering type, an A.C. oscillator, a cathode ray oscilloscope, and a variable air condenser used as ballast capacitance. The assembled measuring cell had a volume of 7 ml., an over-all length of 7 in. and air capacitance of 24.2 $\mu\mu$f. It consisted of an outer Pyrex brand glass tube having a ground glass joint which supported an inner electrical assembly. This electrical assembly included four concentric nickel cylinders spaced 50 mils apart and having outside dimensions of 21 mm. in length by 16 mm. in diameter. Alternate cylinders were connected by nickel prongs to form two electrodes. These were attached to leads extending through an inner glass tube having at the top the inner seal of the ground glass joint. The leads terminated as external connections. From the measurement of the capacitance of the cell empty (i.e., with air) and then filled with 3-(1H,1H,3H-tetrafluoropropoxy)-3-methylphthalide the dielectric constant of the phthalide was calculated using the equation $$\frac{C_k - C_e}{C_a} + 1 = E$$

where $C_k$ = observed capacitance of cell containing material when measured at the terminals (includes the capacitance of the leads and a ballast capacitance of 100 $\mu\mu$f.).
$C_e$ = observed capacitance of cell containing air when measured as $C_k$ was measured = 126 $\mu\mu$f.
$C_a$ = capacitance of cell containing air minus ballast capacitance and capacitance of leads = 24.2 $\mu\mu$f.

At 28° C. and at 200 to 1000 cycles the capacitance of the cell containing 3-(1H,1H,3H-tetrafluoropropoxy)-3-methylphthalide was 894 $\mu\mu$f., which corresponds to a dielectric constant of 32.8.

EXAMPLE 2

*Electrical Properties of 3-(Polyfluoroalkoxy)-3-Methyl (or Phenyl)Phthalides*

The dielectric constant of representative 3-(polyfluoroalkoxy)-3-methyl (or phenyl) phthalides of the invention at 8000 cycles and 25° C. as determined by the procedure of Example 1 is given in the following table. Although some of the phthalides have a melting point above 25° C., they tend to exist at 25° C. as supercooled liquids and were measured as such.

| | Dielectric constant |
|---|---|
| 3-(1H,1H-trifluoroethoxy)-3-phenylphthalide | 21.7 |
| 3-(1H,1H,3H-tetrafluoropropoxy)-3-methylphthalide | 32.8 |
| 3-(1H,1H,3H-tetrafluoropropoxy)-3-phenylphthalide | 23.0 |
| 3-(1H,1H,5H-octafluoropentoxy)-3-phenylphthalide | 18.9 |

The dielectric constant at 8,000 cycles of a sample of 3-(1H,1H,3H - tetrafluoropropoxy) - 3 - phenyl phthalide varied with the temperature as follows.

| Temperature, °C.: | Dielectric constant |
|---|---|
| 25 | 23.0 |
| 45 | 20.8 |
| 75 | 18.2 |
| 100 | 16.4 |

EXAMPLE 3

When 3-(1H,1H,3H - tetrafluoropropoxy) - 3 - phenylphthalide is mixed with isomers of trichlorobiphenyl to provide a greater fluidity than the ester alone and a higher dielectric constant than the chlorinated biphenyl, the dielectric constant of the mixture varies with its composition as shown in the following table.

| 3-(1H, 1H, 3H-Tetra-fluoro-propoxy-3-phenyl-phthalide, parts by weight | Trichlorobi-phenyl isomers, parts by weight | Dielectric Constant at 25° C. and 4,000 cycles |
|---|---|---|
| 100 | 0 | 23.0 |
| 80 | 20 | 18.6 |
| 60 | 40 | 15.1 |
| 40 | 60 | 11.9 |
| 0 | 100 | 5.8 |

Other properties of these mixtures are tabulated below.

Properties of mixtures of 3-(1H,1H,3H-tetrafluoropropoxy)-3-phenylphthalide (A) and trichlorobiphenyl isomers (B).

| Composition, percent by volume | 100A | 42A 58B | 100B 100B |
|---|---|---|---|
| Viscosity, in centistokes, °F.: | | | |
| 210 | 13.8 | 3.99 | 2.37 |
| 100 | 1,588 | 68.4 | 18.1 |
| ASTM Slope | 1,122 | 1,125 | 1,094 |
| Pour point, °F. (ASTM D-97) | 35 | 16 | 5 |
| Flash point, °F. (ASTM D-92) | 384 | 356 | 370 |

Similarly, a mixture of 3 - (1H,1H - trifluoroethoxy) - 3-phenylphthalide and isomers of trichlorobiphenyl provides a dielectric composition having a dielectric constant that varies from the relatively low value of the trichlorobiphenyl isomers to the high value of the trifluoroethoxyphthalide, for example,

| 3-(1H,1H-Tri-fluoroethoxy)-3-phenyl-phthalide, Parts by volume | Trichlorobi-phenyl isomers, Parts by volume | Dielectric Constant at 25 ° C. and 8,000 cycles |
|---|---|---|
| 100 | 0 | 21.7 |
| 75 | 25 | 17.0 |
| 50 | 50 | 12.5 |
| 25 | 75 | 9.0 |
| 0 | 100 | 5.8 |

EXAMPLE 4

A capacitor (shown in Dielectric Materials and Applications, A. R. Von Hippel, Editor, The Technology Press of M.I.T. and John Wiley and Sons, p. 198), is made up of sections composed of alternate layers of aluminum foil separated by sheets of special kraft cellulose paper. A section is constructed by winding the metal foil and paper on a mandrel, removing the assembly, and pressing it into a flat oval shape. The section so formed is placed with a multiple number of similar sections within an insulating box and the whole assembly inserted in a metal case. Connections to the foils are made by inserting thin metal strips at the upper ends of the capacitor sections. Then the sections are connected in various series or parallel combinations by soldered flexible leads. Next, the capacitor is placed in a vacuum oven for several days to remove air and moisture and then completely impregnated with purified 3-(1H,1H,3H-tetrafluoropropoxy)-3-methylphthalide while vacuum is maintained. Finally the capacitor case is sealed. The resultant capacitor has an exceptionally high capacitance.

Similarly, the capacitor may be impregnated with a dielectric composition consisting of 50% of 3-(1H,1H,3H-tetrafluoropropoxy) - 3 - phenylphthalide and 50% of an isomeric mixture of trichlorobiphenyl to attain high capacitance.

The following Examples (a) through (d) describe the preparation and analysis of representative species phthalides of the present invention.

(a) Preparation of 3-(1H,1H-Trifluoroethoxy) 3-Phenylphthalide

To 452 g. (2 moles) of o-benzoylbenzoic acid recrystallized from xylene and having a melting point of 130° C. contained in a 2-l. round bottom flask equipped with a stirrer, dropping funnel, reflux condenser, and drying tube was added dropwise 175 ml. (2.4 moles) of colorless thionyl chloride. During the addition of the thionyl chloride the mixture was agitated and its temperature kept between 30° and 40° C. The colorless thionyl chloride was prepared by the method of Fisher (Experiments in Organic Chemistry, 2nd ed., p. 381, 1949) employing boiled linseed oil. The mixture was stirred at room temperature overnight and the excess thionyl chloride and hydrogen chloride removed at 45° C. and a pressure of 7 mm. On cooling the residual 3-chloro-3-phenylphthalide to room temperature 200 g. (2 moles) of 1H,1H-trifluoroethanol was added dropwise. The reaction was stirred at 40° C. overnight and then at 100° C. for three hours. By distillation a colorless liquid amounting to 414 g. was collected at 165° C. and 0.4 mm. pressure and identified as 3-(1H,1H-trifluoroethoxy)-3-phenylphthalide. The phthalide had $n_D{}^{20}=1.5300$, exhibited only one carbonyl peak in its infrared spectrum and that at 5.6µ, characteristic of the phthalide, and gave the confirmatory chemical analysis:

Calculated for $C_{16}H_{11}O_3F_3$: C—62.3%, H—3.57%, F—18.5%. Found: C—62.6%, H—3.8%, F—18.3%.

(b) Preparation of 3-(1H,1H,3H-Tetrafluoropropoxy)-3-Methylphthalide

To 153 g. (0.74 moles) of phosphorus pentachloride contained in a 1-l. round bottom flask equipped with a reflux condenser was added over a period of one hour at 25° C. 121 g. (0.74 mole) of o-acetylbenzoic acid. When the reaction mixture became liquid, it was heated at 50° C. at 100 mm. pressure to remove phosphorus oxychloride. To the reactor was then added 195 g. (1.48 moles) of 1H,1H,3H-tetrafluoro-1-propanol and 2 g. of absorbent charcoal, and the reaction mixture was heated at 45° C. overnight and at 100° to 108° C. for four hours. The mixture was cooled to room temperature, filtered, and diluted with 300 ml. of ether. The ether solution was washed with an aqueous buffer solution at pH 8. The lower ether layer was separated, dried over anhydrous magnesium sulphate, and distilled. At first the ether was removed, then the excess polyfluoropropanol, and at 98° to 103° C. and 0.04 mm. pressure was obtained 3-(1H,1H,3H - tetrafluoropropoxy) - 3 - methylphthalide having $n_D^{20}=1.4695$ and a characteristic infrared spectrum. The confirmatory chemical analysis is:

Calculated for $C_{12}H_{10}O_3F_4$: C—51.8%, H—3.96%, F—27.3%. Found: C—52.0%, H—3.6%, F—27.2%.

(c) Preparation of 3-(1H,1H,3H-Tetrafluoropropoxy)-3-Phenylphthalide 84 ml. (137 g., 1.15 moles) of high grade thionyl chloride was placed in a 1 l. four-necked flask equipped with agitator, thermometer, high efficiency reflux condenser operated with cooling water at 0° C., inert gas blanket and charging funnel. Through the funnel was then added with agitation 226 g. (1.00 mole) of oven dried (105° C.) o-benzoylbenzoic acid over a period of five minutes. The mixture was agitated for one hour at 40–45° C. and then quickly stripped to a pot temperature of 45° C. at 3 mm. pressure. There remained 244 g. (quantitative yield) of 3-chloro-3-phenylphthalide.

To this was added from a dropping funnel over a period of 5–10 minutes with agitation 94 ml. (139.5 g., 1.06 moles) of 1H,1H,3H-tetrafluoro-1-propanol. Agitation was continued at 45° C. for 1 hour and the mixture then stripped to a hot temperature of 100° C. at 3 mm. pressure. Upon cooling, the crude product, amounting to 330 g. (97% of theoretical 340 g.), was diluted with 200 ml. carbon tetrachloride, 100 ml. water added and the mixture agitated vigorously while enough 10% sodium hydroxide solution was added to bring the pH to 10. After separation of the aqueous layer and several subsequent water washings of the organic layer, the latter was transferred to a still, the solvent removed and the product distilled at about 145° C./0.2 mm. pressure to give a total yield of 306 g. or 90% of theory of the desired product having a characteristic phthalide infrared spectrum.

|  | Percent C | Percent H | Percent F |
|---|---|---|---|
| Calculated for $C_{17}H_{12}O_3F_4$ | 60.0 | 3.53 | 22.3 |
| Found | 59.8 | 3.9 | 21.8 |

When a slurry of 1 mole o-benzoylbenzoic acid in 200 ml. benzene was treated with 0.5 mole of silicon tetrachloride and the resulting 3-chloro-3-phenylphthalide treated with 1H,1H,3H-tetrafluoro - 1 - propanol, a 56% yield of the 3-(fluoropropoxy)-3-phenylphthalide was obtained, identified by boiling point (~150° C./0.2 mm.), dielectric constant (21.4 at 50° C.) and infrared spectrum.

Similarly, addition of 1 mole of o-benroylbenpoic acid to 2.4 moles oxalyl chloride and subsequent reaction of the 3 - chloro - 3 - phenylphthalide with 1H,1H,3H-tetrafluoro-1-propanol furnished 41% yield of the same 3-(fluoropropoxy)-3-phenylphthalide product, identified by boiling point (~155° C./0.2 mm.), dielectric constant (21.8/50° C.), and infrared spectrum.

(d) Preparation of 3-(1H,1H,5H-Octafluoropentoxy)-3-Phenylphthalide

To 113 g. o-benzoylbenzoic acid previously dried in an oven at 105° C. was added dropwise over 30 minutes with agitation 120 g. (100% excess) of thionyl chloride. After stirring overnight at room temperature the mixture was heated under 5 mm. vacuum to 45° C. to remove HCl. There was then added dropwise with agitation at room temperature 150 g. (29% excess) 1H,1H,5H-octafluoro-1-pentanol over a period of 30 minutes, with agitation being continued at room temperature overnight. Nitrogen was then bubbled through the charge while heating to 100° C. to remove HCl. Any remaining HCl was removed by stripping to 10 mm. pressure at 100° C.

The charge was allowed to cool to room temperature and 100 ml. water was added; then the pH was brought to 10 with sodium carbonate solution and the product washed with five changes of water and distilled at about 155° C./0.01 mm. The yield was about 85% of theory.

|  | Percent C | Percent H | Percent F |
|---|---|---|---|
| Calculated for $C_{19}H_{12}O_3F_8$ | 51.8 | 2.73 | 34.4 |
| Found | 52.0 | 2.9 | 35.5 |

The infra-red spectrum was characteristic of the phthalide form.

This application is a continuation-in-part of copending application Serial No. 846,783, filed October 16, 1959.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A compound represented by the formula

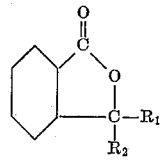

wherein $R_1$ is a polyfluoroalkoxy group having the formula $-OCH_2(CH_2)_nY$ in which alkoxy group Y is selected from the group consisting of hydrogen and fluorine, and $n$ is an integer within the range of 1 to 5 and $R_2$ is a member of the group consisting of methyl, ethyl, phenyl and tolyl.

2. 3 - (1H,1H,3H - tetrafluoropropoxy) - 3 - methylphthalide.

3. 3 - (1,H,1H,3H - tetrafluoropropoxy) - 3 - phenylphthalide.

4. 3-(1H,1H-trifluoroethoxy)-3-phenylphthalide.

No references cited.